(12) United States Patent
Tibosch

(10) Patent No.: US 10,327,973 B2
(45) Date of Patent: Jun. 25, 2019

(54) DEVICE, USE OF THE DEVICE AND METHOD FOR SCATTERING CREMATION ASHES

(71) Applicants: Bart Stok, Nijmegen (NL); Henricus Johannes Antonius Maria Tibosch, Berlicum (NL)

(72) Inventor: Henricus Johannes Antonius Maria Tibosch, Berlicum (NL)

(*) Notice: Subject to any disclaimer, the term of this patent is extended or adjusted under 35 U.S.C. 154(b) by 0 days.

(21) Appl. No.: 15/566,975

(22) PCT Filed: Apr. 5, 2016

(86) PCT No.: PCT/NL2016/050234
§ 371 (c)(1),
(2) Date: Oct. 16, 2017

(87) PCT Pub. No.: WO2016/167645
PCT Pub. Date: Oct. 20, 2016

(65) Prior Publication Data
US 2018/0085272 A1    Mar. 29, 2018

(30) Foreign Application Priority Data
Apr. 17, 2015  (NL) ................................. 2014660

(51) Int. Cl.
| A61G 17/08 | (2006.01) |
| B05B 7/14 | (2006.01) |
| B64D 1/16 | (2006.01) |
| B65D 83/06 | (2006.01) |
| A61G 19/00 | (2006.01) |
| A61G 17/00 | (2006.01) |
| A45B 3/00 | (2006.01) |
| F21V 35/00 | (2006.01) |

(52) U.S. Cl.
CPC ............ *A61G 17/08* (2013.01); *B05B 7/1486* (2013.01); *B64D 1/16* (2013.01); *B65D 83/06* (2013.01); *A45B 3/00* (2013.01); *A61G 17/004* (2016.11); *A61G 19/00* (2013.01); *F21V 35/00* (2013.01)

(58) Field of Classification Search
CPC ...... A61G 17/08; A61G 17/004; A61G 19/00; B05B 7/1486; B64D 1/16; B65D 83/06; A45B 3/00; F21V 35/00
USPC ...................... 27/1; 431/289; 135/67; 111/92
See application file for complete search history.

(56) References Cited

U.S. PATENT DOCUMENTS

| 2,012,164 A | 2/1934 | Gordon |
| 3,014,443 A | 5/1959 | Keyser et al. |

(Continued)

FOREIGN PATENT DOCUMENTS

| DE | 10 2006 013876 A1 | 9/2007 |
| GB | 2 346 611 A | 8/2000 |

OTHER PUBLICATIONS

International Search Report for PCT/NL2016/050234 dated Aug. 11, 2016.

*Primary Examiner* — William L Miller
(74) *Attorney, Agent, or Firm* — Shumaker, Loop & Kendrick, LLP

(57) ABSTRACT

A device and method for scattering cremation ashes including an elongated container body having a receiving space and a scattering element, the device configured as a walking stick and having an actuator for scattering cremation ashes present in the container body upon actuating the actuator.

13 Claims, 4 Drawing Sheets

(56) References Cited

U.S. PATENT DOCUMENTS

| | | | | |
|---|---|---|---|---|
| 4,877,203 A | * | 10/1989 | Harden | A61G 17/08 244/136 |
| 5,005,784 A | * | 4/1991 | Harden | B64D 1/16 222/181.2 |
| 5,813,098 A | | 9/1998 | Schneider | |
| 6,550,114 B1 | * | 4/2003 | Reece | F23G 1/00 27/21.1 |
| 7,624,485 B2 | * | 12/2009 | Crandlemire | B05B 7/1445 222/637 |
| 8,739,374 B2 | * | 6/2014 | Brown | A61G 17/08 27/1 |
| 8,959,731 B2 | * | 2/2015 | Lynch | A61G 17/08 27/1 |
| 9,233,045 B2 | * | 1/2016 | Lynch | A61G 17/08 |
| 9,625,144 B2 | * | 4/2017 | Lynch | F21V 35/00 |
| 10,077,900 B2 | * | 9/2018 | Lynch | F23D 3/16 |
| 2003/0066173 A1 | * | 4/2003 | Reece | F23G 1/00 27/1 |
| 2006/0179623 A1 | * | 8/2006 | Robinson | A61G 17/08 27/1 |
| 2009/0229096 A1 | * | 9/2009 | Crandlemire | B05B 7/1445 27/1 |
| 2011/0220733 A1 | * | 9/2011 | Larson | B64D 1/16 239/10 |
| 2014/0041169 A1 | * | 2/2014 | Brown | A61G 17/08 27/1 |

* cited by examiner

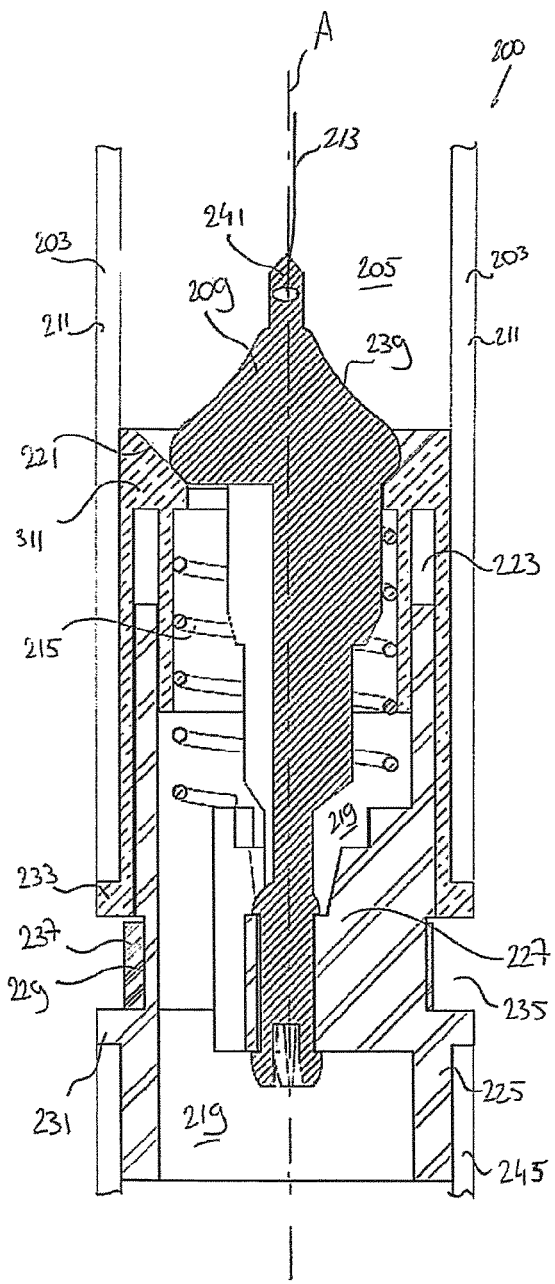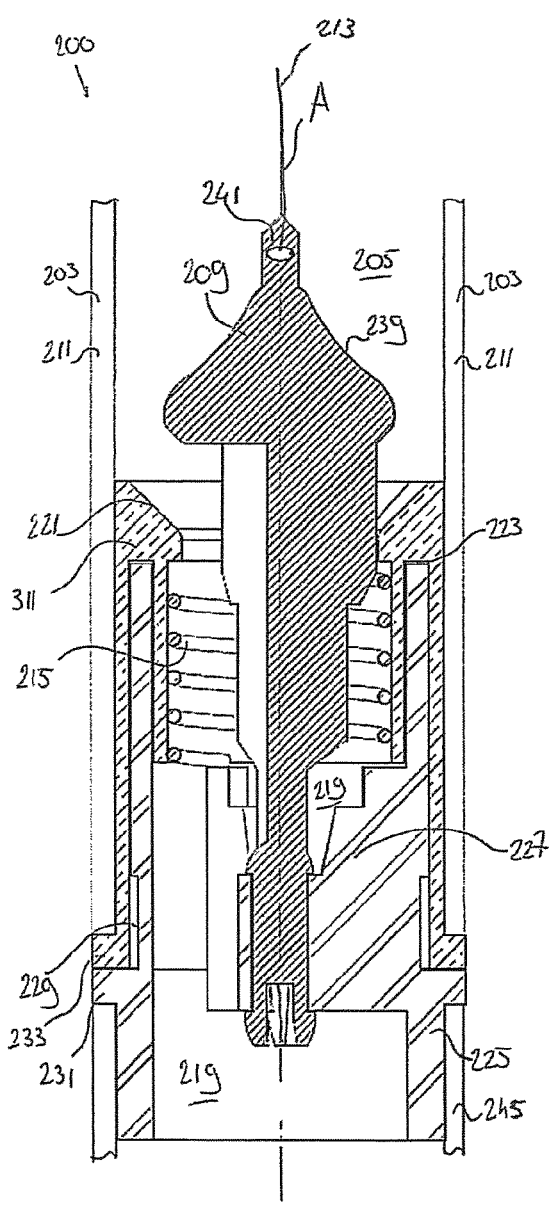
Figure 4                    Figure 5

DEVICE, USE OF THE DEVICE AND METHOD FOR SCATTERING CREMATION ASHES

TECHNICAL FIELD AND BACKGROUND

According to a first aspect, the present invention relates to a device for scattering cremation ashes of a deceased and cremated being, such as an animal or a human, comprising an elongate container body comprising a receiving space for receiving cremation ashes and a scattering element connected to the container body for scattering cremation ashes from the receiving space.

According to a second aspect, the invention relates to a use of a device according to the present invention for scattering cremation ashes of a deceased and cremated being, such as an animal or a human.

According to a third aspect, the invention relates to a method for scattering cremation ashes of a deceased and cremated being, such as an animal or a human, using a device according to the present invention.

A known device for containing and scattering cremation ashes is in the form of an urn. To enable scattering of the cremation ashes present in the urn, the lid of said urn can be removed, so that the receiving space in the urn becomes accessible. After the receiving space has become accessible in this manner, the cremation ashes can be scattered.

A drawback of the known device is that the cremation ashes are blown away upon being scattered, for example due to the wind or movement of the urn. Said blowing away of the cremation ashes is usually found to be unpleasant on account of the fact that it can lead to a person's clothing, hair and/or eyes, for example, becoming dirty.

BRIEF SUMMARY

Accordingly it is an object of the present invention to provide a device wherein the risk of cremation ashes being blowing away is reduced.

This object is achieved with the device according to the invention in that the device is configured as a walking stick and that it comprises an operating element which is operatively connected to the scattering element and which is configured for scattering a metered amount of the cremation ashes present in the container body in use from the receiving space upon being actuated. The inventor has found that, using the known device, the risk exists that cremation ashes will be blown away if the ashes exit the receiving space relatively quickly. This risk is reduced if cremation ashes are scattered in a metered manner using a walking stick, in particular if only a specified amount of the cremation ashes present in the container body of the walking stick in use is scattered from the receiving space. The device is configured so that only a specified amount of cremation ashes is dispensed upon actuation of the operating element. Said specified amount may be a predetermined amount, it may be a constant amount, or the amount may vary slightly each time an amount is dispensed. Important is that the operating element makes it possible to empty the receiving space of its contents in steps. Because of the relatively small volume that can be scattered in one go, the risk of ashes being blown away with the unpleasant drawbacks this entails is reduced. The object of the present invention is thus realised.

Preferably, the scattering element is provided near a first end of the elongate container body and the operating element is provided at a second end opposite said first end. By arranging the two elements spaced from each other, the distance between the operator of the device and the cremation ashes exiting the receiving space is increased, so that any blowing away of ashes will take place at a greater distance from the operator.

It is advantageous if an elongate connecting element is provided between the operating element and the scattering element for coupling a movement of the operating element to the scattering element. In this way a controlled movement of the scattering element can be realised in a relatively simple manner.

Preferably, the operating element is movable in the longitudinal direction of the container body relative to said container body for actuation thereof. This is advantageous in particular because it is possible to meter a predetermined amount of cremation ashes by simply leaning on the walking stick. The walking stick can thus be used as a cane for scattering cremation ashes in a metered manner.

It is advantageous if the scattering element and/or the operating element are at least in part located within the container body. Accommodating at least one of the elements in the container body makes it possible in a relatively simple manner to produce an optically attractive device.

Preferably, the container body is at least substantially hollow-cylindrical. Such a shape makes it possible to realise a relatively large receiving space in a form that is practical for the operator.

It is advantageous if the scattering element is movable between a first position, in which the scattering element closes the receiving space, and a second position, in which the scattering element releases the receiving space. The provision of two position makes it possible in a simple manner to realise metered delivery of cremation ashes.

In a second position of the scattering element, the scattering element can define a metering cavity in conjunction with the container body, which metering cavity is configured to meter a predetermined amount of cremation ashes upon actuation of the operating element. The movable scattering element makes it possible for the metering cavity to be filled relatively quickly from the receiving space. In particular when the device is used during a walk, for example, when the stick is supported on the ground and the operating element is actuated in a repetitive manner, it is desirable that the filling of the metering cavity takes place in a quick and reliable manner in order to achieve a more reliable operation of the device.

It is advantageous in that regard if the scattering element, in a first position thereof, is held against a seat element present in the container body so as to close the receiving space. In particular, use is made in that case of a pushing element such as a spring member for pushing the scattering element directly or indirectly against the seat element. Because the scattering element is in the first position when no actuation takes place, unwanted scattering of cremation ashes is prevented.

It is advantageous if a cavity for a candle is provided at one end of the device. It is advantageous in that case if a holding element for holding the device in a substantially vertical position is provided so as to thus provide a candlestick for candles. The device can in that case be used as a candleholder in memory of the deceased being.

In a practical embodiment, the device comprises a GPS module for registering a position of the device. The provision of a GPS module makes it possible to record a route the device has travelled. Recording such a route is attractive for providing walking routes. The invention is based on the perception that third parties also wish to travel a route covered by the device.

According to a second aspect, the invention relates to a use of a device according to the present invention for scattering cremation ashes of a deceased and cremated being, such as an animal or a human, wherein the cremation ashes are scattered by actuating the operating element at least twice. The advantages of this use are analogous to the advantages of the device according to the invention as already explained in the foregoing.

According to a third aspect, the invention relates to a method for scattering cremation ashes of a deceased and cremated being, such as an animal or a human, using a device according to the present invention, wherein the method comprises the steps of:

a) supporting the device on a ground surface;

b) actuating the operating element, wherein a metered amount of the cremation ashes present in the container body in use is scattered from the receiving space; and c) moving the walking stick clear of the ground surface.

This method is advantageous because a metered, in particular predetermined, amount of cremation ashes is scattered over the ground, wherein the risk of the ashes being blown away is reduced.

Preferably, the successive steps a), b) and c) are carried out at least twice, so that the scattering of cremation ashes takes place at least twice while the device is being moved ahead by an operator. In this way it has become possible to scatter a plurality of portions of the cremation ashes along a walking route, for example while making a walk. Survivors of the deceased being may regard said plurality of portions as a ritual trail representing the path of life of the deceased and cremated being. Such a ritual trail may present a special experience to the survivors. With this in mind, it is preferable if the device is configured for scattering the amount of cremation ashes present in the container body in a plurality of parts from the receiving space, wherein said plurality is preferably greater than 10, more preferably greater than 25, in particular ranging between 40 and 80. By distributing the amount of cremation ashes in the device in this manner, the user will be able to realise such a ritual trail.

BRIEF DESCRIPTION OF THE DRAWINGS

The present invention will now be explained by means of a description of a preferred embodiment of a device according to the invention and of the use of the present invention, in which reference is made to the following schematic figures, in which:

FIG. 4 is a cross-sectional front view of a part of a further preferred embodiment of the device according to the present invention, showing said part in a first position thereof;

FIG. 5 shows the part of FIG. 4 in a second position thereof;

DETAILED DESCRIPTION

Figure 1:
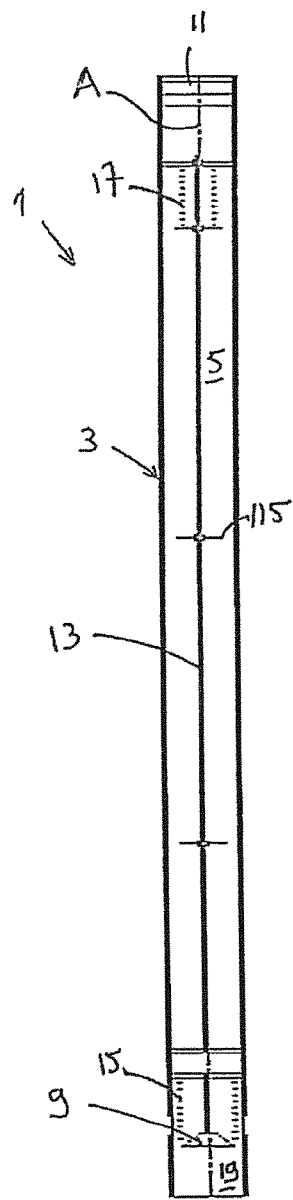
FIG. 1 is a cross-sectional front view of a preferred embodiment of the device according to the present invention.

FIG. 1 shows a device according to the present invention in the form of a walking stick 1. The walking stick 1 comprises an elongate container body 3 having an axial longitudinal axis A. The container body 3 shown in FIG. 1 is configured as a tubular hollow cylinder. The container body 3 surrounds a receiving space 5, which is configured for containing cremation ashes 7. Near the bottom side of the walking stick 1 shown in FIG. 1, a scattering element 9 is provided. On the side of the container body 3 opposite the scattering element 9, an operating element 11 is provided.

The receiving space 5 preferably has a volume of at least 3 liters for containing at least all of the cremation ashes of a deceased and cremated being. Other dimensions are also conceivable, however.

Figure 2:
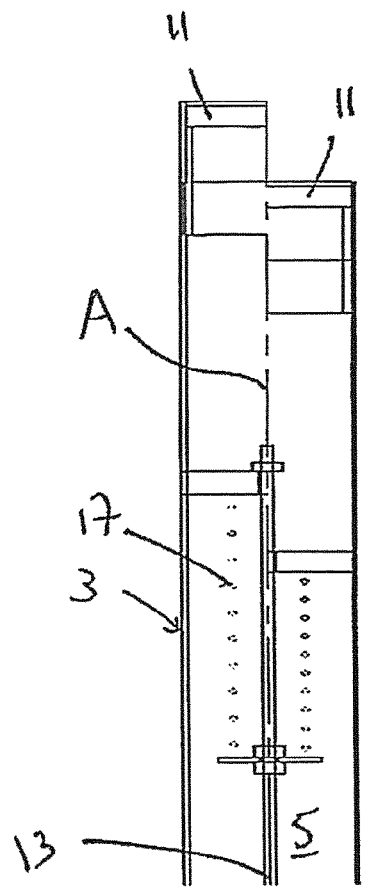
FIG. 2 is a more detailed view of a part of the device of FIG. 1.
Figure 3:
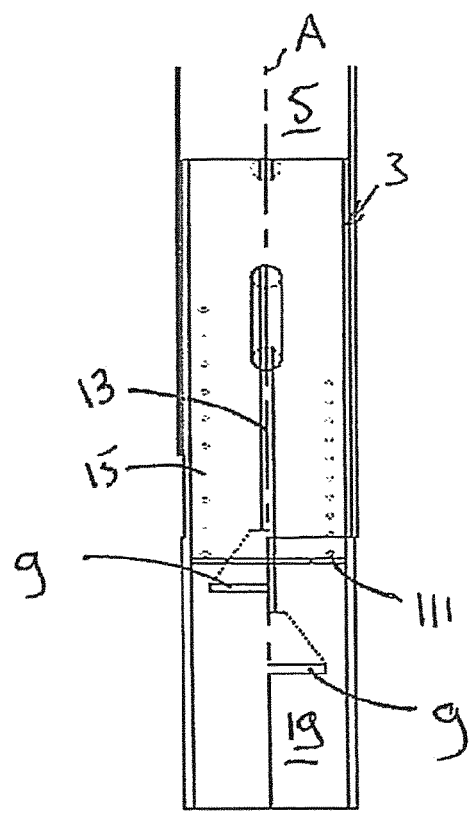
FIG. 3 is a more detailed view of a part of the device of FIG. 1.

The scattering element 9 is shown in more detail in FIG. 2 and is shaped as a conical, rotation-symmetrical element that can move in axial direction in the container body 3 along the longitudinal axis A of the container body. Although this shape is advantageous, other shapes are also conceivable, of course, such as a ball or a flat plate. On the left-hand side of the longitudinal axis A in FIGS. 2 and 3, the situation is shown in which the scattering element is in a first position, in which the scattering element 9 closes the receiving space 5. The scattering element 9 thus functions as a closure of the receiving space 5. On the right-hand side of the longitudinal axis A in FIGS. 2 and 3, the situation is shown in which the scattering element 9 is in a second position, in which the scattering element 9 releases the receiving space. In the first position, the scattering element 9 bears against a seat element 111 provided on the inner side of the container body 3. In FIG. 3 the position of an operating element 11 that corresponds to the aforesaid first and second position is shown in more detail.

The operating element 11 and the scattering element 9 are operatively interconnected by means of an elongate connecting element 13. In the illustrated embodiment, this connecting element is formed by a rigid shaft 13, although another embodiment of said connecting element 13 is also conceivable, of course, for example in the form of a different transmission such as a cable or a chain. The connecting element is configured so that movement of the operating element 11 in axial direction of the container body 3 will result in a corresponding axial movement of the scattering element 9. Transverse element(s) 115 is/are provided on the rigid shaft 13 for compressing and/or loosening cremation ashes 7 present in the receiving space 5 upon movement of the rigid shaft 13 in axial direction of the container body 3. Compressing and/or loosening the cremation ashes in this manner reduces the risk of relatively large cavities occurring in the cremation ashes 7 in the container body 3.

In the situation in which the operating element 11 is not being operated, both the operating element 11 and the scattering element 9 are in the first position, because a spring 15 and a spring 17 are operative between the scattering element 9 and the container body 3 (spring 15) and between the operating element 11 and the container body 3 (spring 17). In the first position, the receiving space 5 is closed, and cremation ashes are held in the receiving space 5. When the operating element 11 is operated against the action of the springs 15 and 17, the scattering element 9 moves clear of the seat element 111, enabling the cremation ashes 7 to exit the receiving space 5 under the influence of the force of gravity. When subsequently actuation of the operating element 11 is ceased, the scattering element 9 will return to the first position under the influence of the action of the springs 15 and 17, in which position the scattering element 9 closes the receiving space 5 again. Movement of the scattering element is accompanied by movement of the transverse elements 115, which transverse elements effect the compression and/or loosening of cremation ashes 7 present in the receiving space 5. Since the container body 3 extends beyond the scattering element 9, the scattering element 9 is spaced from a ground surface by some distance. The scattering element, in conjunction with the container body 3, thus defines a metering cavity 19 when the walking stick 1 is placed on the ground surface. Upon operation, said metering cavity 19 will be filled with cremation ashes 7 if sufficient cremation ashes 7 are present in the receiving space 5. The volume of the metering cavity 19 thus determines a maximum amount of cremation ashes 7 that can be scattered upon actuation of the operating element 11. Thus, a predetermined amount of cremation ashes 7 can be scattered by changing the volume of the metering cavity 19.

Figure 6:
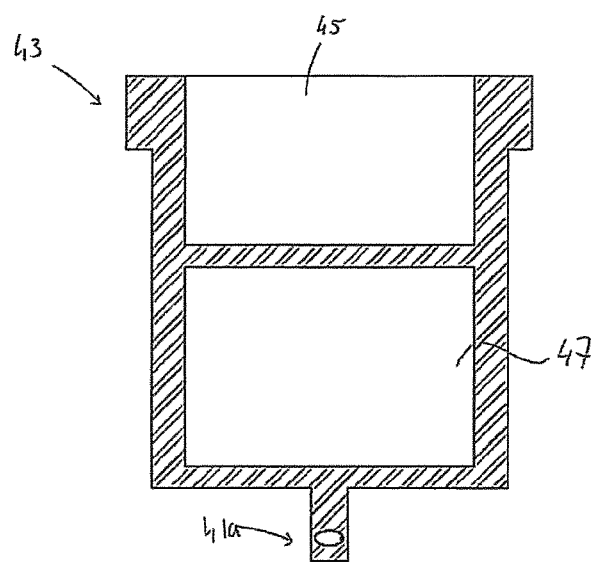
FIG. 6 shows a part of a device according to the present invention.

In one embodiment of the walking stick 1, the operating element 11 is configured as a receiving element 43 as shown in FIG. 6. The receiving element 43 comprises a receiving space 45 for receiving a candle. The receiving element is further provided with a GPS module 47 for registering a position of the walking stick. On the side opposite the receiving space 45, the receiving element 43 is provided with a fixing element 41a for fixing the connecting element 13 thereto.

FIGS. 4 and 5 show a part of another preferred embodiment of a device according to the present invention configured as a walking stick 200. In FIG. 4, parts comparable to parts shown in FIGS. 1, 2 and 3 are indicated by the same numerals incremented by 200. The operating element 211 is formed by the container body 203. On the side of the scattering element 209, the receiving space 205 is partially bounded by a seat element 311 provided with a contact surface 221 that faces the receiving space 205, against which the scattering element 209 can abut. In a position in which the scattering element 209 abuts against the contact surface 221 of the seat element 311, the receiving space 205 is substantially closed on the side of the scattering element 209. The scattering element 209 is provided with an pushing element in the form of a spring element 215 for pushing the scattering element 209 against the contact surface 221 of the seat element 311. The seat element 311 is provided with a recess 223 for slidably accommodating a metering element 225. At an outer circumference of the metering element 225, a support element 245 is provided on the side remote from the seat element 311. The metering element 225, the support element 245 and the seat element 311 define a metering cavity 219. In said metering cavity 219, ribs 227 are provided for holding the scattering element 209, which ribs 227 are integral with the metering element 225. The ribs 227 extend at an angle relative to the axial longitudinal axis A on the side facing the receiving space 205 for realising, in use, a relatively good outflow of cremation ashes present in the metering cavity 219.

A first locking element 231 is provided on the outer wall 229 of the metering element 225. A second locking element 223 is provided on the seat element 311. The first locking element 231 and the second locking element at least in part define a space 235 for receiving a locking element 237. The locking element 237 locks the metering element 225 in position relative to the seat element 311 so as to prevent unwanted movement of the metering element 225 relative to the seat element 311, which could result in cremation ashes present in the receiving space 5 flowing out of the receiving space 205.

On the side facing the receiving space 205, the scattering element 209 is provided with an inclined surface 239 that slopes from the longitudinal axis A to the seat element 311. In the position of the scattering element 209 that is shown in FIG. 5, the seat element 311 and the surface 239 form a ring-shaped funnel for discharging cremation ashes from the receiving space 205.

Near the longitudinal axis A, the scattering element 209 is provided with a fixing element 241 for fixing a connecting element 213 thereto. The connecting element 213 extends from the scattering element 209, through the receiving space 205, up to a short end of the receiving space 205, to which short end the connecting element 215 is connected. The connecting element 213 is configured as a flexible material, preferably an elastic material, on which transverse elements 315 are provided.

In one embodiment of a walking stick 201, in which the operating element is formed by the container body, the receiving element 43 is provided at a short end of the receiving space opposite the scattering element.

In another embodiment of a walking stick 201, the receiving element 43 is integral with the container body.

The skilled person will realise that in the foregoing the invention has been explained with reference to a preferred embodiment. Various equivalent embodiments and modifications are conceivable within the scope of the invention.

It is for example conceivable that a different amount of cremation ashes is scattered each time the operating element is operated. As long as said amount remains limited to a maximum amount, however, the advantages of the invention are achieved. In other embodiments, the same predetermined amount of cremation ashes is dispensed each time the device is operated.

Thus it is furthermore conceivable for the operating element and the scatter element to be configured differently. Preferably, the receiving space comprises an outlet opening which is closed by the scattering element in a first position and released by the scattering element in a second position. In one embodiment, the scattering element is configured as a rotatable or pivotable disc, wherein an opening of the scattering element is temporally aligned with the outlet opening of the receiving space when the operating element is being operated. It is conceivable in that regard for the rotational or pivoting movement to be affected by a translational movement of the operating element. A suitable connecting element will be used for that purpose for converting the translational movement into a rotational or pivoting movement.

As described above, the invention makes it possible to scatter cremation ashes in a metered manner, preventing unwanted blowing away of said ashes and its concomitant drawbacks. The protection sought is defined in the appended claims.

The invention claimed is:

1. A device for scattering cremation ashes of a deceased and cremated being comprising an elongate container body comprising a receiving space for receiving the cremation ashes and a scattering element connected to the container body for scattering the cremation ashes from the receiving space, wherein the device is configured as a walking stick provided with an operating element which is operatively connected to the scattering element and which is configured for scattering a metered amount of the cremation ashes present in the container body from the receiving space upon being actuated.

2. The device according to claim 1, wherein the scattering element is provided near a first end of the elongate container body and the operating element is provided at a second end opposite said first end.

3. The device according to claim 1, wherein an elongate connecting element is provided between the operating element and the scattering element for coupling a movement of the operating element to the scattering element.

4. The device according to claim 1, wherein the operating element is movable in a longitudinal direction of the container body relative to said container body for actuation thereof.

5. The device according to claim 1, wherein at least one of the scattering element and the operating element are at least in part located within the container body.

6. The device according to claim 1, wherein the container body is at least substantially hollow-cylindrical.

7. The device according to claim 1, wherein the scattering element is movable between a first position, in which the scattering element closes the receiving space, and a second position, in which the scattering element unblocks the receiving space.

8. The device according to claim 7, wherein the scattering element, in a first position thereof, is held against the seat element present in the container body so as to close the receiving space, wherein the scattering element is provided with a pushing element for pushing against the scattering element in the first position.

9. The device according to claim 1, wherein a cavity for receiving a candle is provided at one end of the device.

10. The device according to claim 1, further comprising a GPS module for registering a position of the device.

11. A candlestick comprising a device according to claim 9 and the holding element for holding the device in a substantially vertical position.

12. A method of scattering cremation ashes of a deceased and cremated being using a device comprising an elongate container body comprising a receiving space for receiving the cremation ashes and a scattering element connected to the container body for scattering the cremation ashes from the receiving space, wherein the device is configured as a walking stick provided with an operating element which is operatively connected to the scattering element and which is configured for scattering a metered amount of the cremation ashes present in the container body from the receiving space upon being actuated, wherein the method comprises the steps of:
 a) supporting the device on a ground surface;
 b) actuating the operating element, wherein a metered amount of the cremation ashes present in the container body in use is scattered from the receiving space; and
 c) moving the walking stick clear of the ground surface.

13. The method according to claim 12, wherein the successive steps a), b) and c) are carried out at least twice.

* * * * *